March 10, 1970 — A. H. WILLINGER — 3,499,526
FISH FEEDER ASSEMBLY
Filed Aug. 29, 1967

INVENTOR.
ALLAN H. WILLINGER
BY Friedman & Goodman
ATTORNEYS

United States Patent Office 3,499,526
Patented Mar. 10, 1970

3,499,526
FISH FEEDER ASSEMBLY
Allan H. Willinger, New Rochelle, N.Y., assignor to Aquariums Incorporated, Maywood, N.J., a corporation of Delaware
Filed Aug. 29, 1967, Ser. No. 664,155
Int. Cl. B65d 79/00; A01k 63/00, 64/00
U.S. Cl. 206—47　　　　　　　　　　　　　　　5 Claims

ABSTRACT OF THE DISCLOSURE

This invention is directed to providing a novel fish feeder combination in which the fish food, the food dispenser and instructions therefor are all held in a single storage container. The fish food, preferably freeze dried Tubifex worms, is stored in the lower portion of the two-part container while the food dispenser or feeder and the instructive material describing the use of the novel combination are stored in the upper portion.

BACKGROUND OF THE INVENTION

Field of the invention

This invention relates generally to fish feeders and fish food. More particularly, the invention relates to a novel combination wherein the fish food and fish feeder are stored as a sigle unit when not in use.

Description of the prior art

Containers for holding fish food are of course well known. The most commonly used one is the one resembling an ordinary spice can, such as a pepper can, and when it is desired to feed pet fish all that is done is to shake some of the food onto the surface of the water. This is generally unsatisfactory, however, since the food tends to cloud the water and the fish have to scour the water surface looking for the food.

SUMMARY OF THE INVENTION

It is therefore among one of the principal objectives of the invention to provide a novel fish feeder combination wherein the fish food, the feeder and an instruction sheet are all stored as a single unit in a container therefor, and when it is desirous to feed the fish, the feeder is provided with food and the feeder is then lowered into the fish tank.

In accordance with the present invention the container is generally cup-shaped and comprises a removable upper portion which slidingly overlies the lower portion. The fish food, preferably comprising freeze dried Tubifex worms in block form, is stored in the lower portion of the container and a cover is provided therefor. The feeder is stored in the upper portion of the container and comprises a generally conically shaped cage-like structure. A suitable string, such as nylon, is provided at the uppermost portion of the conical feeder so that the feeder may be hung into the aquarium. An annular metal body is further provided for the bottom of the feeder so that it may sink into the water of the aquarium. The feeder rests on the aforementioned cover along its horizontal surface. An instruction sheet describing the use of the feeder is also stored in the upper portion of the container.

BRIEF DESCRIPTION OF THE DRAWING

The invention will be hereinafter more fully described with reference to the accompanying drawing, in which.

DESCRIPTION OF THE PREFERRED EMBODIMENTS

Figure 2:
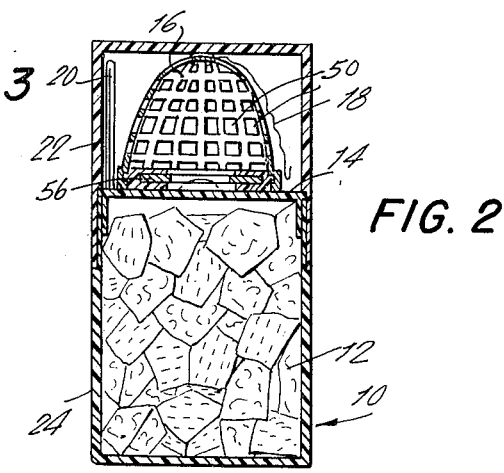
FIGURE 2 is an elevational view in cross-section showing the inventive device in attached relationship.
Figure 1:
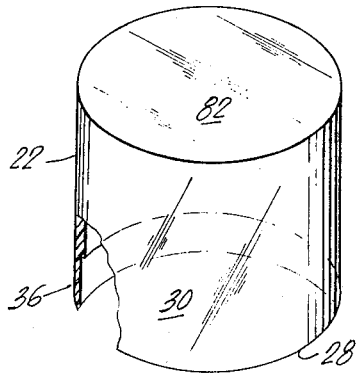
FIGURE 1 is an exploded view of the fish feeder combination showing the various parts thereof in detached relationship.

Referring now to the figures of the drawings, FIG. 2 shows the container 10, the freeze dried Tubifex worms 12 contained therein, the cover 14 for said worms 12, the feeder 16 resting on said cover 14 with string 18 attached and the instruction sheet 20 also resting on said cover 14. Turning now to FIG. 1 which shows the inventive device in exploded detail the container 10, generally cylindrically shaped (it may also be square, or the like), consists of an upper portion 22 and a lower portion 24. The upper portion 22 removably and concentrically overlies the upper end of lower portion 24 by means of associatingly adapted flange portion 26 upon which the lower rim 28 of portion 22 rests so that the outer walls 30 and 32 of portions 22 and 24, respectively, are in smooth relationship. Stating this another way, the upper rim portion 34 of lower portion 24 fits inside the lower rim portion 36 of upper portion 22. The container 10 is made of a suitable plastic, preferably styrene or the like, although it may also be glass which is less preferable.

The said dried worms 12 are stored in the said lower portion 24 of the container 10. A cover 14 is provided therefor which slidingly fits inside rim portion 34 of lower portion 24 and rests by a flange 40 on rim 42 of the lower portion 24. The flange 40 is integral with the upper surface 44 of cover 14 and emerges horizontally therefrom, said flange 40 also being in smooth relationship with the outer surface of rim portion 34, so that the upper portion 22 of said container 10 may slidingly overlie said lower portion 24 by its rim portion 36. The cover 14 is also provided on upper surface 44 with a nipple 45 for ease of removal of the cover 14 from rim portion 34. The cover 14 is made of a suitable plastic, preferably polyethylene, or the like.

Figure 3:
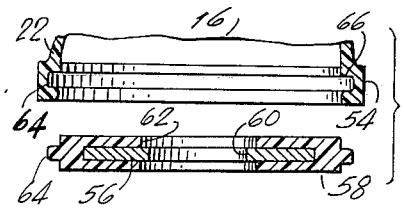
FIGURE 3 is a view in cross-section showing the lower portion of the feeder in fragmented form with the plastic encased annular metal body shown removed therefrom.

The feeder 16 is generally conically shaped and has a cage-like structure, i.e. there being rows of windows 50 cut along the horizontal planes of said feeder 16, said rows being substantially parallel one to the other. The feeder 16 has a hollow interior 52 wherein the dried worms 12 will be placed as subsequently described. At the base of the feeder 16 (FIG. 3) integral with the structure is provided a base portion 54 adapted to detachably receive a metal washer 56 encased within a suitable annular body 58, with bore 60 of said washer 56 and the bore 62 of said annular body 58 being substantially in registry. An outwardly extending flange 64 is provided along the outer wall of said annular body 58, which flange 64 is engaged by associatingly inwardly directed flange 66 provided on the inner surface of base portion 54, so that the annular body 58 (containing metal washer 56) is effectively "snapped" into place inside base portion 54. This annular body 58 is easily removed for cleaning of the "cage" if desired and easily "snapped" back into place. A string 18, preferably made of nylon, although it may be any suitable string, is secured to the uppermost portion 70 of feeder 16 through one of the ribs 72 separating the windows 50. The feeder 16 is made of preferably a suitable plastic material and the annular body is also made thereof, such as preferably polyethylene, or the like.

Figure 4:
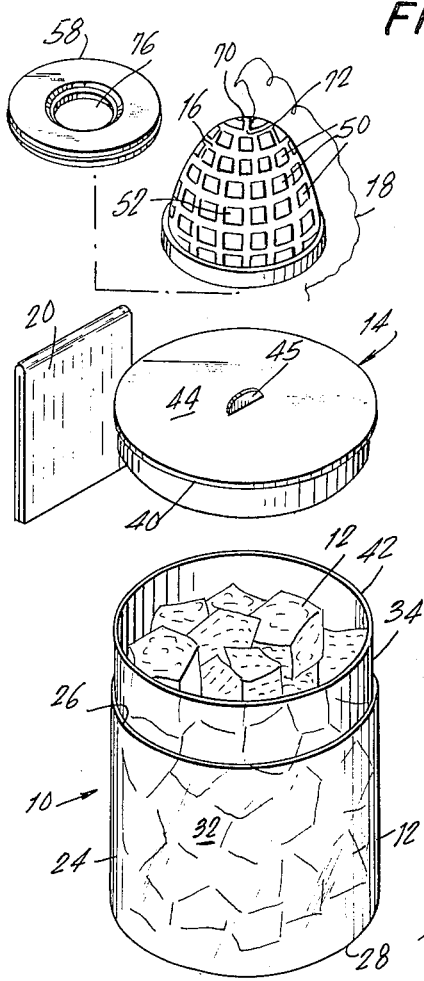
FIGURE 4 is a view illustrating the feeder containing the food as hung into the aquarium with the fish responding thereto, the aquarium being in fragmented form.
Figure 4:
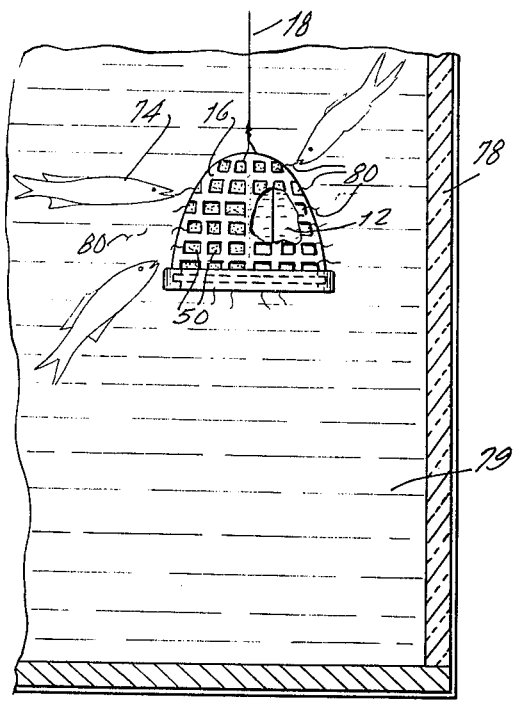

The freeze dried Tubifex worms 12 are prepared by quick freezing live Tubifex worms under high vacuum to form small blocks of compact food. This method of preservation has been found to retain the original nutritional values found in the live worms. When it is required to feed the pet tropical fish 74 a block of the freeze dried Tubifex worms 12 is inserted into the aperture 76 formed by the annular body 58 and washer 56 and the feeder is then hung into the aquarium 78 (FIG. 4) by means of the string 18. The feeder 16 is held down in the water 79 by means of the weight of the metal washer 56 and the block of dried worms 12 floats upwardly in the cage-like feeder 16. Within about a minute the freeze dried Tubifex worms 12 absorb water and appear to come to life by the action of the water causing flagellation of the fibers 80 of the worms as water is absorbed thereby. The fibers of food emerge from the windows 50 of the feeder 12 and the fish 74 are irresistibly attracted thereto. The advantages of this novel feeder are that the source of food is centralized for the fish and the water is not caused to cloud up by the employment of this type of food, as described.

An instruction sheet 20 is folded up and provided inside upper portion 22 of container 10. It may rest on cover 14 alongside feeder 16 or may be placed between the uppermost portion 70 of feeder 16 and the ceiling 82 of said portion 22. The instructions contain pertinent details on the use of the feeder and food and the like preparation of the food and the like. The upper portion 22 of container 10 may be inverted and used as a receptacle, or a "drip-container," for the wet feeder 16 after feeding the fish to protect the surface upon which the feeder may be laid, e.g. furniture, etc.

Thus it can be seen that a novel compact unit has been provided which holds the fish food, the feeder and instructions therefor. While freeze dried Tubifex worms are preferred as the food staple, it is to be understood that other fish foods may also be utilized with the feeder described herein.

Having thus described the fundamental novel features of the invention as applied to a specific embodiment, it is to be understood that various changes may be made by those skilled in the art without departing from the scope thereof.

I claim:
1. An assembly comprising a container containing a fish food, said container having a lid enclosing said container and said fish food, a cagelike structure having a plurality of openings overlying said lid, said structure having an open bottom, a washer member engaging the bottom of said structure and at least partially enclosing said bottom of said structure, said washer member being detachably removable from said structure, a cover member enclosing said structure and engaging said lid and said container.

2. An assembly according to claim 1, wherein said food means comprises freeze dried Tubifex worms.

3. An assembly according to claim 1, wherein said cage-like structure comprises a generally conically shaped hollow body whose walls are adapted to conform to a cage-like structure, and a detachably engageable weighted base secured thereto.

4. An assembly according to claim 3, wherein said detachably weighted base comprises an annular metal body encased within another annular member consisting of like material to said conically shaped hollow body, with the opening means of said metal body and said annular member being substantially in registry, an outwardly extending flange being provided along the outer wall of said annular member for detachably engaging an associatingly inwardly directed flange provided on the lower inner surface of said conically shaped hollow body.

5. An assembly according to claim 4, wherein within said cover member there is instructional material and said cage-like structure has secured thereto at its to a string member.

References Cited

UNITED STATES PATENTS

| 2,306,312 | 12/1942 | Hyde | 119—51 |
| 2,775,226 | 12/1956 | Early | 119—51 X |
| 2,891,711 | 6/1959 | Early | 119—51 X |
| 2,984,208 | 5/1961 | Kopietz | 119—5 X |
| 3,095,852 | 7/1963 | Goldman | 119—5 X |
| 3,115,865 | 12/1963 | Parkes et al. | 119—23 X |
| 3,316,884 | 5/1967 | Viggars | 119—51 X |
| 3,324,590 | 6/1967 | Richardson | 43—131 |

ALDRICH F. MEDBERY, Primary Examiner

U.S. Cl. X.R.

43—44.99; 119—5; 220—23